No. 668,298. Patented Feb. 19, 1901.
G. W. RAYMOND.
SELF CENTERING SEWER PIPE.
(Application filed Apr. 18, 1900.)

(No Model.)

Witnesses:

Inventor:
George W. Raymond
by Humphrey & Humphrey
Attorneys.

UNITED STATES PATENT OFFICE.

GEORGE W. RAYMOND, OF NEW YORK, N. Y.

SELF-CENTERING SEWER-PIPE.

SPECIFICATION forming part of Letters Patent No. 668,298, dated February 19, 1901.

Application filed April 18, 1900. Serial No. 13,346. (No model.)

*To all whom it may concern:*

Be it known that I, GEORGE W. RAYMOND, a citizen of the United States, residing at New York, in the county of New York and State of New York, have invented a certain new and useful Improvement in Self-Centering Sewer-Pipes, of which the following is a specification.

My invention has relation to improvements in socket-pipe for drains, sewers, and like purposes, usually made of clay, burned and vitrified.

Heretofore considerable difficulty has been experienced in forming the joints so as to secure accurate registering of the sections, often resulting in a shoulder or jog to form an impediment to the perfect flow of particles of matter, as thread, string, sand, &c., carried by the water, which accumulate at the joints and not only prevent the perfect cleansing of the pipe, but form an unhealthy mass from a sanitary standpoint.

The object of my invention is to so overcome these difficulties as to secure accurate registering of the pipe-joints and practically make the interior of the sections a true tube, to provide better configuration to permit of sealing and cementing the joints, to provide a socket in which no intermediate shoulder or obstruction can prevent the pipe "bottoming" therein while laying, and to construct a pipe-socket which will permit the largest as well as the smallest pipe to slide into place so the pipe will come against the shoulder of the socket without the necessity of lifting the pipe in the act of placing the sections in deep or wet trenches.

To the aforesaid object my invention consists in the peculiar and novel construction, arrangement, and combination of parts hereinafter described and then specifically pointed out in the claims, reference being had to the accompanying drawings, which form a part of this specification.

Figure 1:
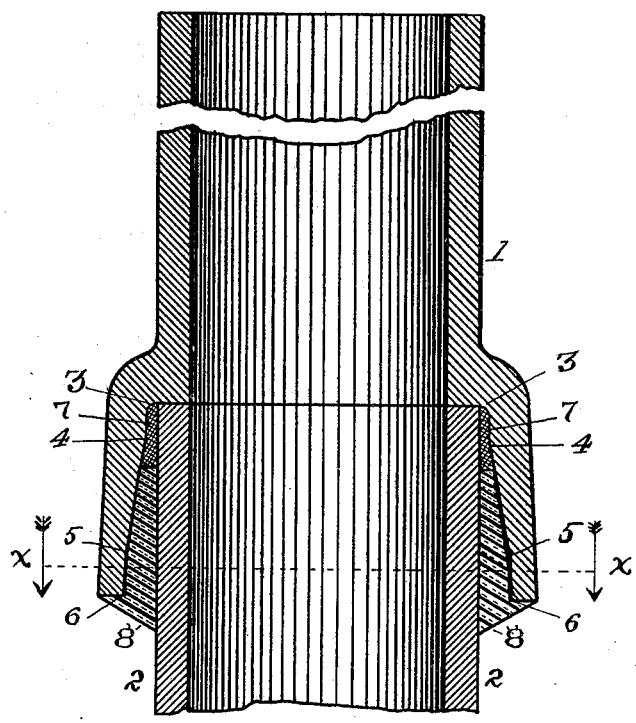
Figure 2:
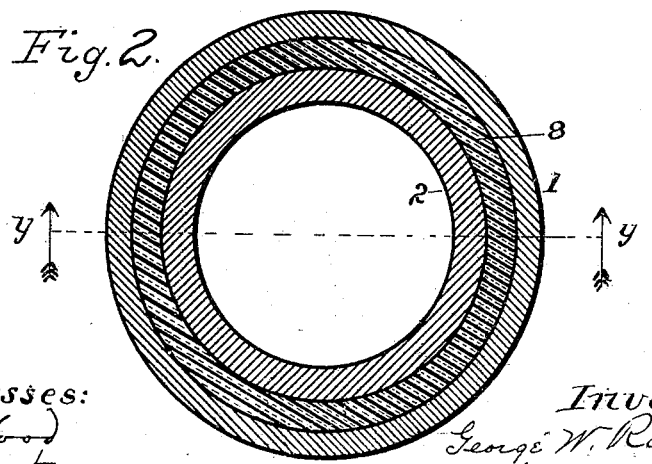

In the accompanying drawings, in which similar reference-numerals indicate like parts in both views, Figure 1 is a vertical central section at the line Y Y of Fig. 2. Fig. 2 is a transverse section at the line X X of Fig. 1.

In the drawings, which represent the adjacent ends of two sections of pipe embodying my invention, 1 is the socket of one pipe, and 2 the end of the next pipe connected therewith. The end of the pipe 2 is a cylinder; but the socket on the pipe 1 is of peculiar construction in the following details: From the the bottom of the socket at 3 to the point 4 it is internally a true cylinder, excepting the very slight rounding of its corners. From the point 4 to point 5 it expands in a straight line when viewed in longitudinal section, and from point 5 to point 6 it is nearly if not exactly a true cylinder. This arrangement unites the smaller with the larger part of the socket without any offset or jog. In uniting sections the space between 3 and 4 is packed with oakum or like material 7, which centers the pipe, and the remaining space to the outer end of the socket is filled with cement 8.

I claim as my invention—

1. An improved socket for sewer and drain pipe having its inner end a substantially true cylinder, the outer end a substantially true cylinder of greater diameter than the inner end, the intermediate portion connecting the two cylindrical portions being in a straight line in longitudinal section, substantially as shown and described.

2. An improved socket for sewer and drain pipe having its inner end a true cylinder, its outer end a true cylinder of greater diameter, the intermediate part being conical, the whole interior being free from any intermediate obstructions or shoulders between its outer opening and the shoulder at its intersection with the pipe on which the socket is formed, substantially as shown and described.

In testimony that I claim the above I hereunto set my hand in the presence of two subscribing witnesses.

GEORGE W. RAYMOND.

In presence of—
VINCENT W. JAMES,
GEO. P. TURNER.